US011793163B2

(12) United States Patent
Hawk et al.

(10) Patent No.: US 11,793,163 B2
(45) Date of Patent: Oct. 24, 2023

(54) ANIMAL DRINKER, IN PARTICULAR FOR BEAKED ANIMALS

(71) Applicant: LUBING MASCHINENFABRIK LUDWIG BENING GMBH & CO. KG, Barnstorf (DE)

(72) Inventors: Chris Hawk, Hixson, TN (US); Michael Abelin, Halen (DE)

(73) Assignee: LUBING MASCHINENFABRIK LUDWIG BENING GMBH & CO. KG, Barnstorf (DE)

( * ) Notice: Subject to any disclaimer, the term of this patent is extended or adjusted under 35 U.S.C. 154(b) by 576 days.

(21) Appl. No.: 16/767,795

(22) PCT Filed: Nov. 21, 2018

(86) PCT No.: PCT/EP2018/000522
§ 371 (c)(1),
(2) Date: May 28, 2020

(87) PCT Pub. No.: WO2019/105579
PCT Pub. Date: Jun. 6, 2019

(65) Prior Publication Data
US 2020/0359598 A1 Nov. 19, 2020

(30) Foreign Application Priority Data

Nov. 29, 2017 (DE) .......................... 102017011041.7

(51) Int. Cl.
*A01K 7/06* (2006.01)
*A01K 39/02* (2006.01)
(52) U.S. Cl.
CPC ................ *A01K 7/06* (2013.01); *A01K 39/02* (2013.01)

(58) Field of Classification Search
USPC ...... 119/72, 74, 75, 76, 77, 79, 80, 70, 53.3, 119/54; D30/121, 132, 131
See application file for complete search history.

(56) References Cited

U.S. PATENT DOCUMENTS 3,021,826 A * 2/1962 Peak .......................... F01L 1/26
123/188.14
3,812,823 A * 5/1974 Ridder ................. A01K 5/0216
119/54

(Continued)

FOREIGN PATENT DOCUMENTS

DE   202005020411 U1    4/2006
DE   202014008421 U1 *  1/2015 ............. A01K 39/02
EP        2767158 A1    8/2014

OTHER PUBLICATIONS

International Search Report dated Feb. 25, 2019 in PCT/EP2018/000522 (5 pages).

*Primary Examiner* — Andrea M Valenti
(74) *Attorney, Agent, or Firm* — FISHERBROYLES, LLP; Keats Quinalty

(57) ABSTRACT

Animal drinkers of an activation unit provided with two arms engaging respective valve pin in an axially oriented manner when pivoting an activator. This reduces wear and leads to a longer service life of the drinker valve. The respective arm can moreover have a channel through which the water exits the drinker valve and can be fed in a targeted manner to the activator to ensure that all of the water exiting the drinker valve makes its way into the water collection tray.

15 Claims, 7 Drawing Sheets

(56) References Cited

U.S. PATENT DOCUMENTS

| | | | | |
|---|---|---|---|---|
| 4,793,291 A * | 12/1988 | Hostetler | ............. | A01K 39/022 |
| | | | | 119/72.5 |
| 4,922,867 A * | 5/1990 | Mathews | ................ | F01L 1/181 |
| | | | | 123/90.22 |
| 2003/0084854 A1* | 5/2003 | Schumacher | ...... | A01K 39/0213 |
| | | | | 119/74 |
| 2005/0150464 A1* | 7/2005 | Schumacher | ............ | A01K 7/06 |
| | | | | 119/75 |
| 2014/0224180 A1* | 8/2014 | Willis | ................ | A01K 39/0213 |
| | | | | 119/72 |

\* cited by examiner

ANIMAL DRINKER, IN PARTICULAR FOR BEAKED ANIMALS

CROSS-REFERENCE TO RELATED APPLICATIONS

The present invention is filed under 35 U.S.C. § 371 as the U.S. national phase of International Application No. PCT/EP2018/000522, filed Nov. 21, 2018, which designated the U.S. and claims the right of priority of German Patent Application No. 102017011041.7, filed Nov. 29, 2017; the entire disclosures of each of which are hereby fully incorporated herein by reference.

The invention relates to an animal drinker, in particular for beaked animals, as claimed in the preamble of claim 1.

Animal drinkers for beaked animals such as chickens, ducks, turkeys, geese, chicks or other poultry, possess an elongate water supply line which is preferably assigned a plurality of drinker valves. In the case of the animal drinker discussed here, the drinker valves are assigned activation units having elongate tubular or rod-type activation means. The beaked animals tilt or pivot, respectively, the elongate activation means in order for a drinker valve to be opened. A valve pin which by way of a lower end region protrudes from the housing of the drinker valve herein is tilted by the activation means, and the drinker valve is opened on account thereof.

It has been demonstrated that the animal drinker described above, having an activation means which is assigned to the respective drinker valve, has various disadvantages. The valve pin of the drinker valve is always pivoted in the same direction by the activation means. This leads to punctiform wear and on account thereof to the drinker valve wearing out in a relatively rapid manner. The supply of the water exiting the open drinker valve leads to water being splashed, said water here potentially not only being pure water but also water which is provided with additives, for example nutriments and/or medicines. Moreover, each drinker valve has to be assigned a dedicated activation means.

Proceeding from the above, the invention is based on the object of achieving an animal drinker, in particular for beaked animals, which does not have the advantages which arise in the practical use of known animal drinkers with activation units.

An animal drinker for achieving this object has the features of claim 1. Accordingly, the end of the activation means that points toward the at least one drinker valve is assigned at least one arm which points sideways, or the activation means has at least one such arm, respectively. This at least one arm on account thereof represents a type of cantilever. This at least one arm, in particular cantilever, of the activation means communicates with the at least one drinker valve. As a result, the drinker valve according to the invention does not have at least one of the disadvantages of known drinker valves mentioned at the outset.

The valve pin preferably communicates with the at least one arm of the activation means. In particular, the at least one arm extends up to a lower free end of the end region of the valve pin of the respective drinker valve. Consequently, the respective valve pin is able to be lifted by the arm assigned thereto in order for the drinker valve to be opened. On account thereof, lateral tilting, which has been usual to date, no longer takes place, or at least does no longer take place to any significant extent. This results in punctiform or unilateral wear, respectively, of the tight fit between the valve pin and the housing of the respective drinker valve being avoided or at least reduced. The service life of the drinker valve is extended on account thereof.

In one advantageous design embodiment of the animal drinker, the activation means is pivotable about an in particular horizontal rotation axis which runs transversely to the longitudinal central axis of said activation means. Alternatively or additionally, it can be provided that the rotation axis runs transversely to the substantially horizontal longitudinal axis of the water supply line. The horizontal rotation axis enables the activation means to be pivoted in the manner of a pendulum, wherein at least one arm which is assigned to the upper end of the activation means is pivoted conjointly with the activation means in order for the drinker valve to be opened. The closing of the drinker valve takes place by releasing the activation means, on account of which the latter, having the arm disposed thereon, returns in a self-acting manner to the initial position and the valve pin, on account thereof, is released for closing the drinker valve.

The at least one arm preferably projects laterally from the activation means so as to be oriented substantially transversely to the longitudinal central axis of the activation means. On account thereof, the arm forms a cantilever at the upper end of the activation means. In particular, the arm herein runs in the longitudinal direction of the water supply line.

In one preferred type of design embodiment of the animal drinker, the activation means is configured as an elongate rod or an elongate pipe which at the upper end that points toward the at least one drinker valve, or to the water supply line, respectively, is connected, preferably in an integral manner, to the at least one arm. In this instance, the activation means and the at least one arm assigned thereto conjointly form an activation installation and/or the activation unit.

An advantageously refined animal drinker is distinguished in that the rotation axis about which the activation means having the at least one arm is pivotable is assigned to a rotary bearing which is disposed so as to be locationally fixed below the water supply line. The rotary bearing is preferably releasably fastened to the water supply line. Alternatively or additionally, it can be provided that the rotary bearing either is connected directly to the water supply line or is connected indirectly with a suspension of the water collection tray, said suspension being connected to the water supply line. When the rotary bearing is assigned to the suspension of the water collection tray, the rotary bearing can be non-releasably connected to the suspension. In this instance, the activation unit is releasable from the water supply line conjointly with the water collection tray.

The locationally fixed assignment of the rotary bearing to the water supply line, which may optionally be releasable, leads to the activation means, conjointly with the at least one arm which is assigned thereto at the upper end, being pivotable about a defined location, and the pivoting about the rotation axis can moreover take place in only one plane, preferably a vertical longitudinal central axis through the longitudinal central axis of the water supply line. On account thereof, the activation means and the at least one arm, which conjointly form the activation installation or the activation unit, respectively, can be pivoted conjointly in the manner of a lever with multiple arms about the preferably horizontal rotation axis in the vertical longitudinal central plane, on account of which the drinker valve assigned to the respective arm is opened thereby by a largely vertical upward movement of the valve pin of said drinker valve. On account of this movement of the valve pin which is at least largely linear, wear on the drinker valve by way of wearing out in a partial or unilateral manner, respectively, is effectively avoided.

One advantageous potential refinement of the animal drinker provides that two drinker valves which are preferably of the same type are assigned to the same activation means, in particular to opposite sides of the activation means. In this instance, the upper end of the activation means is assigned two arms which project laterally on opposite sides of the activation means. The two arms are in particular connected to the activation means in a fixed and/or integral manner.

In an activation unit having an activation means which has two arms oriented in opposite directions, each arm preferably communicates with one drinker valve, in particular the lower end of the valve pin of said drinker valve. One arm in each case thus activates one drinker valve. On account thereof, the two drinker valves assigned to one activation means can be activated, in particular opened and/or closed, in an alternating manner when said activation means is pivoted. This takes place in such a manner, that when pivoting the activation means one arm is moved upward in order for the valve pin of the drinker valve assigned thereto to be lifted, and that the opposite arm moves downward, away from the drinker valve assigned thereto, and thus does not activate said drinker valve. To this end, the activation means is pivotable in the opposite direction by way of the two arms which are fixedly disposed at the upper end of said activation means.

The drinker valve is advantageously refined in such a manner that the or each arm which is disposed at the upper end of the activation means is configured as an open channel. Because the respective arm extends at least up to the drinker valve assigned thereto, preferably somewhat beyond said drinker valve, the water exiting the open drinker valve makes its way into the channel. In that the activation means for opening the drinker valve is pivoted by way of the or each arm having the channel, the channel is imparted a profile which is inclined slightly downward toward the activation means. On account thereof, water exiting the drinker valve is directed in a targeted and preferably complete manner to the activation means. Splashing is avoided in this instance.

In order to prevent in the case of an activation lever that is pivoted back and a channel which in this instance runs so as to be approximately horizontal, residual water which is situated in the channel from being unable to flow out by way of the free end of the arm, the channel at this free end of the respective arm is preferably closed. In this instance, residual water also flows from the channel to the activation means in the case of non-activated activation means that is pivoted back. To this end, it can be provided that the base of the channel in the case of a non-pivoted activation unit situated in the resting position runs slightly toward the tubular or rod-type, respectively, activation means.

It is preferably also provided that the base of the channel of the respective arm communicates with the lower free end of the valve pin which protrudes downward from the drinker valve. When pivoting the activation means and moving the end of the arm upward on account thereof, the valve pin in this instance is moved upward from the base of the channel in order for the drinker valve to be opened, and specifically preferably moved upward only or substantially only axially along the longitudinal central axis of the drinker valve.

In order for the water exiting the drinker valve to be able to make its way in a targeted manner into the activation means configured in a tubular manner, or be able to flow externally along the activation means configured in a rod-type manner, the channel of the or of each arm is guided close to the upper end region of the activation means, in particular somewhat above the upper end side of the latter. On account thereof, it is ensured that water from the drinker valve, with the aid of the channel, makes its way in a targeted manner from above onto or into the activation means. Splashing of water is effectively counteracted on account thereof.

In an activation means configured in the manner of a rod or a bar, it is provided according to one advantageous refinement of the animal drinker that the activation means at least across a majority of the length thereof has a cross-sectional profile which forms or has, respectively, one external channel or two external channels. Said channel preferably runs so as to be parallel to the longitudinal central axis of the rod-type activation means. On account of the or the respective channel, water from the channel of the respective arm can trickle down in a targeted manner on the rod-shaped activation means. The water makes its way on account thereof into the water collection tray in a guided manner. This also counteracts an uncontrolled exit of water.

Preferred exemplary embodiments of the animal drinker according to the invention will be explained in more detail hereunder by means of the drawing in which.

The animal drinker shown in the figures is configured as a so-called in-line drinker for barn-raising beaked animals. The animal drinker enables all types of beaked animals, in particular chickens, chicks, ducks, and similar to meet their water requirement in a self-acting manner. The animal drinker is also suitable for young beaked animals such as chicks.

Each animal drinker shown in the figures possesses an elongate tubular water supply line 10. Drinker locations 11 are provided so as to be preferably spaced apart at identical spacings along the water supply line 10. All drinker locations 11 in the exemplary embodiment shown are identically configured.

Figure 1:
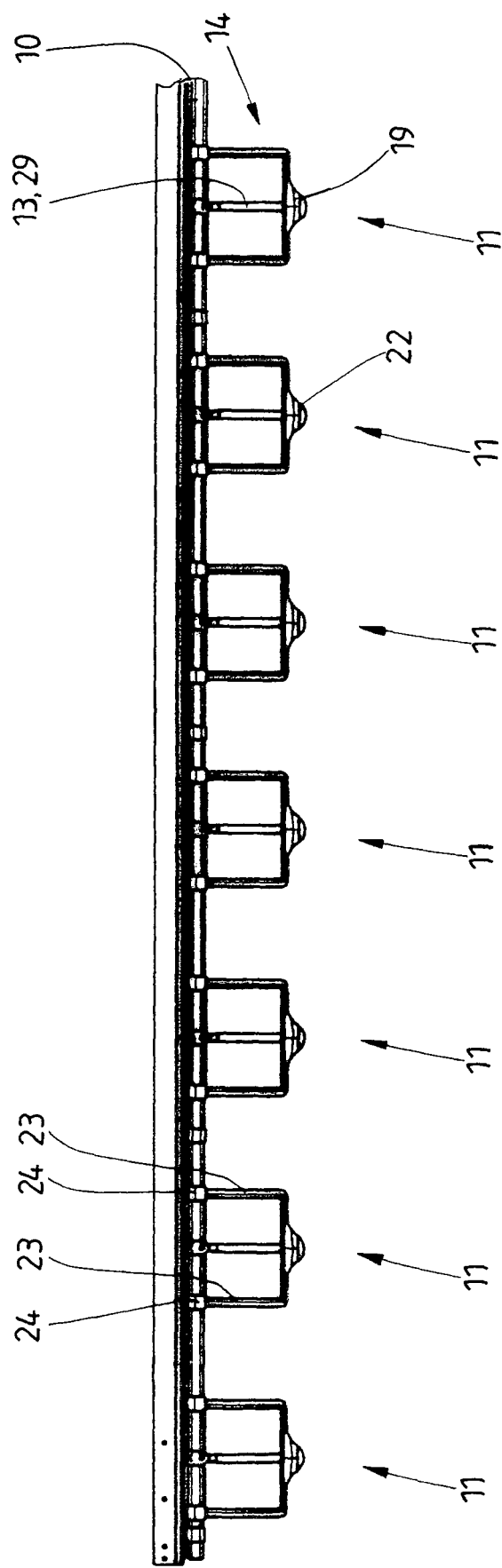
FIG. 1 shows a schematic lateral view of part of the animal drinker.
Figure 2:
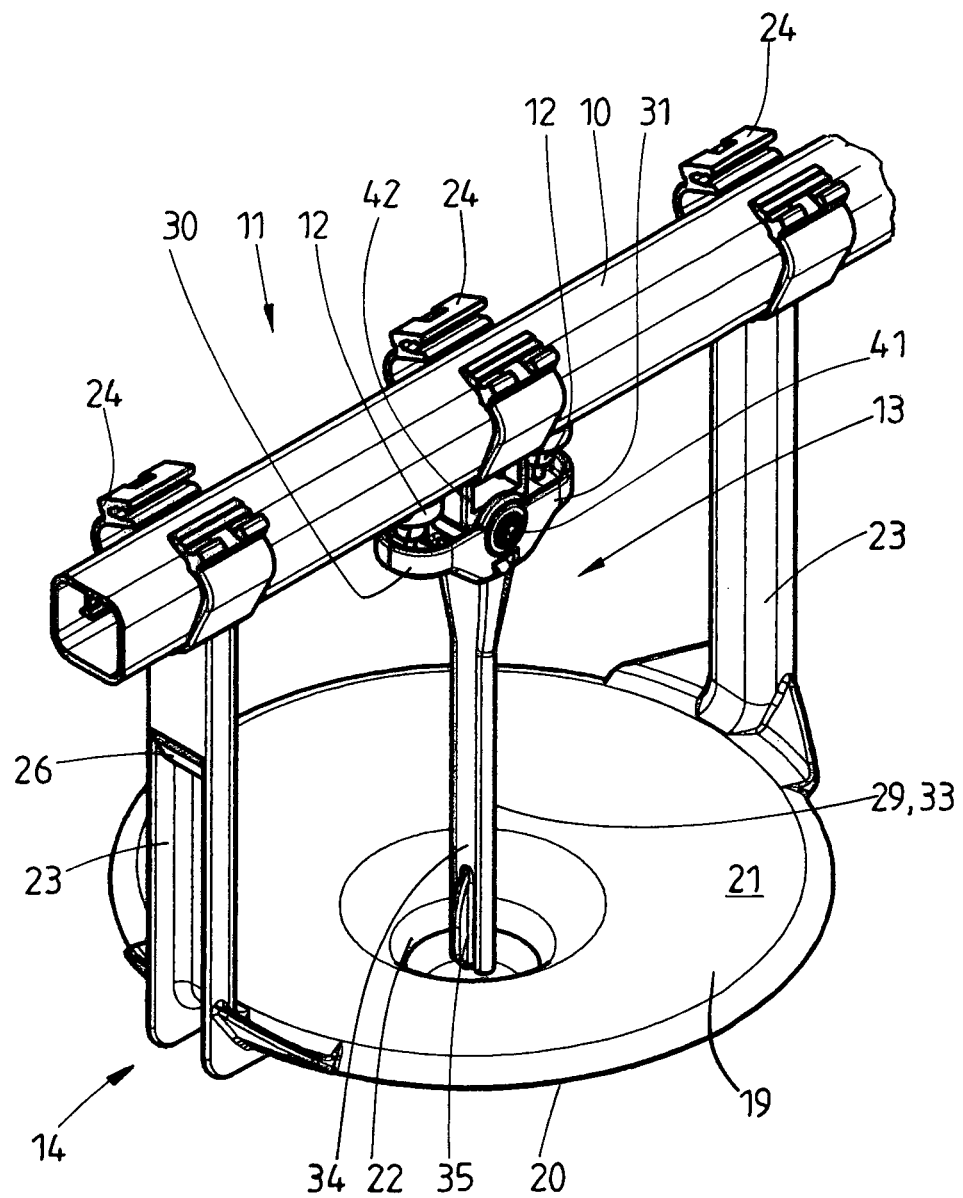
FIG. 2 shows a perspective illustration of part of the animal drinker of FIG. 1 in the region of a drinker location having a water collection tray.
Figure 3:
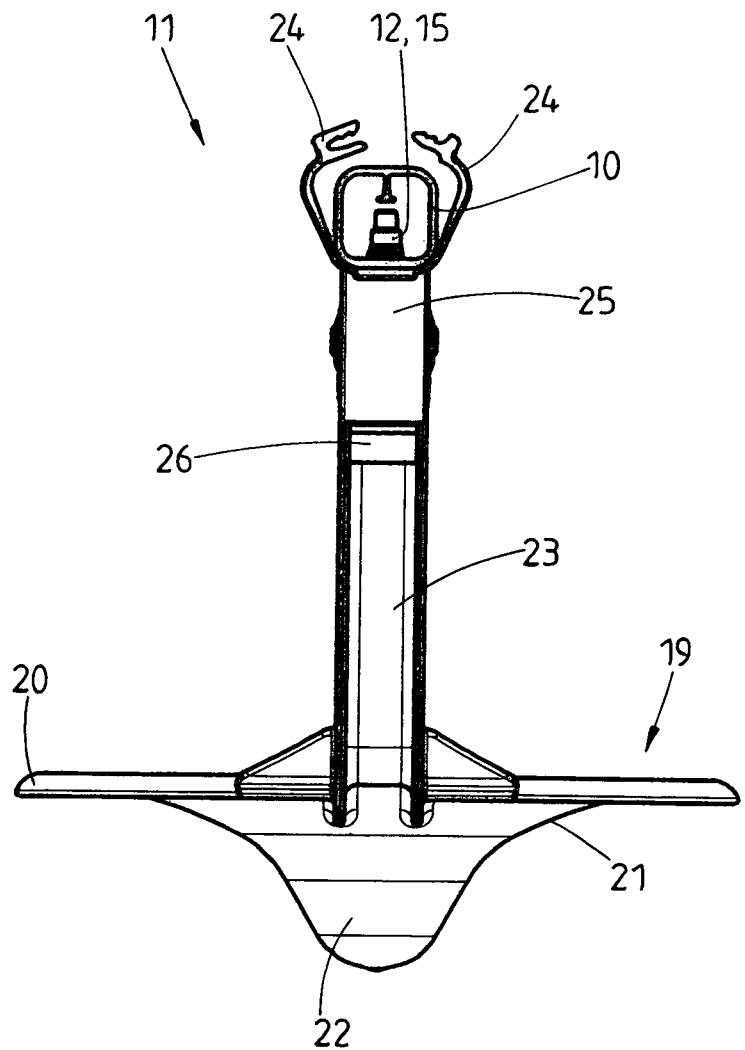
FIG. 3 shows a view of the water dispensing location of FIG. 2 from the side.
Figure 4:
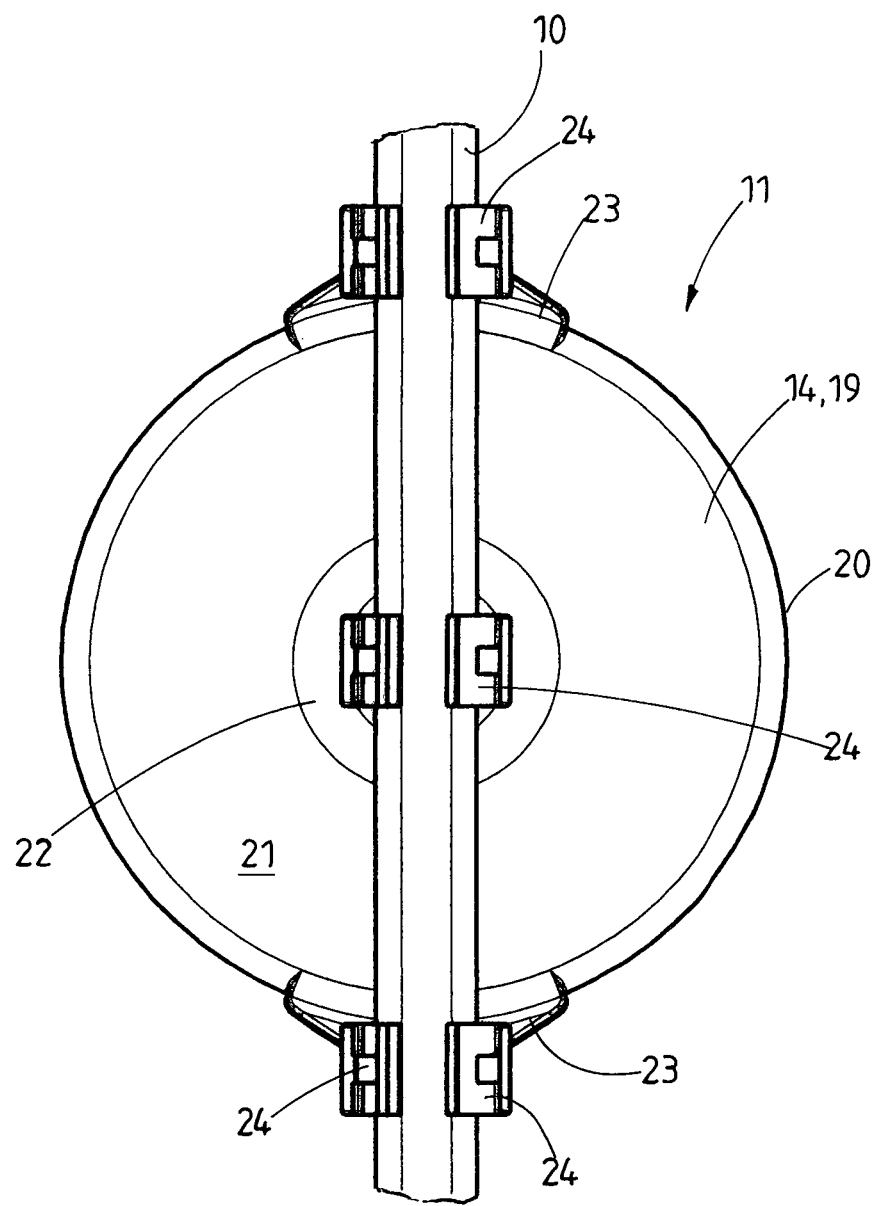
FIG. 4 shows a plan view of the water dispensing location of FIG. 2.

The water supply line 10 in a barn is disposed on support ropes (not shown in FIG. 1) so as to be preferably horizontally oriented or optionally disposed at a slight gradient at the provided minor spacing from the floor.

Each of the drinker locations 11 which here are identically configured has in the exemplary embodiment shown two identical drinker valves 12 which are disposed beside one another in pairs at a small spacing, one activation unit 13, and one water collection tray 14. The two neighboring drinker valves 12 of the same drinker location 11 can be selectively opened individually and/or alternatingly by the same single activation unit 13 assigned to said drinker valves 12. To this end, the spacing of the two drinker valves 12 of each drinker location 11 is so minor that the activation unit 13 can be disposed therebetween, and both drinker valves 12 are situated in the region of influence of the same single activation unit 13 of the drinker location 11. This spacing is significantly smaller than the spacing of the drinker valves between neighboring drinker locations 11.

Each of the identically configured drinker valves 11 has a housing 15 and a valve pin 16 which partially protrudes from below the housing 15. The respective drinker valve 12 by way of an upper part of the housing 15 thereof is screwed from below into the water supply line 10 and sealed. The valve pin 16 by way of a lower end region 17 protrudes from below the housing 15. Said end region 17 is the limited by a lower free end 18 of the valve pin 16. The valve pin 16 of the respective drinker valve 12 is activatable from the lower end 18 of the end region 17. The parallel longitudinal central axes of the two drinker valves 12 of the respective drinker location 11 run so as to be perpendicular and/or orthogonal to the preferably horizontal water supply line 10.

The water collection tray 14 in the exemplary embodiment shown possesses a lower tray part 19 having a circular ring 20. The rim 20 can however also have profiles, for example an elliptic profile. The tray part 19 of rotationally symmetrical configuration possesses a base wall 21 having a cross section in the manner of a bowl or bell, respectively. The curvature radius of the base wall 21 continuously increases from the rim 20 to the center of maximum depth. On account thereof, a central region of the tray part 19 has a deep bowl 22. The water collection tray 14 shown here possesses two holding arms 23 which emanate from diametrically opposite locations of the rim 20. Said holding arms 23 run in a mutually parallel manner perpendicularly from the tray part 19 up to the preferably horizontal water supply line 10. The holding arms 23 at the upper end are provided with holding clips 24 so as to releasably fastened the water collection tray 14 below the water supply line 10. In the exemplary embodiment shown, the holding clips 24 are not disposed directly on the upper ends of the holding arms 23 but on the ends of a web 25 which extends longitudinally below the water supply line 10 in the region of the drinker location 11. Latching means 26 which serve for connecting the upper ends of the holding arms 23 in a latching and optionally releasable manner to the web 25 are disposed below the web 25 at opposite end regions of the latter.

The web 25 of the water collection tray 14 is provided with two identically configured passages 27 so as to pass through a lower part of the housing 15 of each of the drinker valves 12 assigned in pairs to the drinker location 11, said lower part of the housing 15 projecting downward in relation to the water supply line 10. The passage 27 is in each case surrounded by an encircling collar 28. Each collar 28 projects downward in relation to the web 25. The passages 27 and the collars 28 are configured such that said passages 27 and said collars 28 surround the parts of the housing 15 of the drinker valves 12 that protrude from below the water supply line 10 in a substantially clearance-free manner. On account thereof, the water collection tray 14 by the drinker valves 12 is fixed in a locationally fixed and immovable, in particular non-displaceable, manner on and below the water supply line 10. In particular, a relative movement, in particular a relative displacement, of the water collection tray 14 along the water supply line 10 and relative to the drinker valves 12 is prevented on account thereof.

The activation unit 13 possesses an elongate activation means and, according to the exemplary embodiment of FIGS. 2 to 6, two arms 30 and 31. The two arms 30, 31 are assigned to the activation means 29, preferably integrally molded on the latter. The activation means 29 thus possesses the two arms 30 and 31. The arms 30 and 31 are identically configured but dissimilarly oriented in that said arms 30 and 31 project in the manner of cantilevers on opposite sides of the activation means 29. The longitudinal central axes of both arms 30, 31 herein are on a common rectilinear axis. This common axis perpendicularly intersects a longitudinal central axis 32 of the activation means 29. The longitudinal central axis 32 of the activation means 29 and the common axis of both arms 30 and 31 are in a vertical plane which runs through a longitudinal central axis of the water supply line 10.

The elongate activation means 29 in the exemplary embodiment shown is configured as a straight elongate rod 33. The solid rod 33 is provided with an eccentric cross section. In the exemplary embodiment shown, at least one part of the rod 33 which extends approximately across half the length of said rod 33 is provided with at least one groove 34 on opposite sides from which the arms 30, 31 emanate, said groove 34 running parallel to the longitudinal central axis 32 of the activation means 29.

Wings 35, preferably thin-walled wings 35, are provided on opposite sides at the lower end, of the activation means 29 configured as the rod 33, where the grooves 34 are. Said wings 35 extend across a lower end region of the rod 33 up to the end of the latter. The ends of the opposite grooves 34 may be divided by the wings 35 such that one groove 34 is created to the left and the right of each wing 35. The faces of the wing 35 are in the vertical plane which runs through the longitudinal central axis 32 of the rod 33 and through the longitudinal central axis of the water supply line 10.

Each of the identically configured arms 30, 31 is configured so as to be approximately U-shaped in the cross section such that a groove 36 which is open at the top is created in each arm 30, 31. On account of the U-shaped cross section, the groove 36 of each arm 30, 31 is delimited on both sides by an upright lateral wall 37. The two opposite lateral walls 37 of each groove 36 run in a mutually parallel manner. The free ends of the grooves 36 that are oriented away from the activation means 29 are closed by an end wall 38 which extends between the lateral walls 37.

On account of a correspondingly curved profile of a base wall 39 of the groove 36, the depth of the groove 36 increases from the respective end wall 38 thereof toward the activation means 29. On account thereof, the deepest location of the groove 36 is situated where said groove 36 transitions to the rod 33 of the activation means 29, or ends at the rod 33, respectively, thus is situated approximately in the region of the longitudinal central axis 32 of the activation means 29.

The groove 36 of each arm 30, 31 at the deepest location has a cutout 40 which is adjacent to the activation means 29. On account of said cutout 40, water exiting the respective drinker valve 12 can flow from the deepest location of the groove 36 into the groove 34 on the corresponding side of the activation means 29, in particular of the rod 33 thereof. To this end, the cutout 40 of each arm 30, 31 is dimensioned and disposed such that said cutout 40 opens into the respective groove 34, or upwardly adjoins the groove 34, respectively. Water from the groove 36 of the respective arm 30 or 31 can thus flow without impediment from above into the respective groove 34. The water at least largely then flows downward in the respective groove 34 of the activation means 29. The water flow at the lower end of the activation means 29 herein is divided at the wings 35. The water herein flows uniformly through the grooves 34 and along the respective wing 35 to the end of the rod 33 which forms the activation means 29, where said water is collected in the water collection tray 14, in particular in the lower bowl 22 of the latter.

The activation unit 13, in particular the activation means 29 having the two opposite arms 30 and 31 assigned to the latter, is pivotable about a horizontal rotation axis 41. Said rotation axis 41 runs transversely to the longitudinal central axis of the water supply line 10, specifically at a spacing below the latter. The rotation axis 41 herein, like the water supply line 10, runs horizontally. The rotation axis 41 in the exemplary embodiment shown is approximately between the lower end region 17 of the valve pins 16 of the two drinker valves 12. The rotation axis 41 preferably is on an imaginary horizontal connection line between the lower ends 18 of the valve pins 16 of the two drinker valves 12, wherein the rotation axis 41 orthogonally intersects said imaginary connection line.

The activation unit 13 having the activation means 29 and the two arms 30, 31 disposed thereon, is mounted on a locationally fixed rotary bearing 42 so as to be pivotable about the rotation axis 41. The rotary bearing 42 in turn is fastened below the water supply line 10 so as to be locationally fixed but releasable between the two drinker valves 12 of the respective drinker location 11. In the exemplary embodiment shown, the rotary bearing is fixedly connected to the web 25 below the water supply line 10, preferably integrally molded to said web 25. The rotary bearing 42 possesses a through bore 43 which lies on the rotation axis 41 or alternately possesses two opposite blind bores. Axle stumps 49 on opposite lateral walls 37 and 38 of the arms 30, 31 engage in the through bores 43, or the blind bores, respectively, said axle stumps 49 being configured so as to correspond to said through bores 43.

The pivoting path of the activation means 29 which is pivotable about the rotation axis 41 is delimited by the opposite wings 35 at the lower end of the rod 33 of the activation means 29, specifically the rod 33 of the latter, and by the base wall 21 in the region of the deep bowl 22 of the tray part 19 of the water collection tray 14. The pivoting angle of the activation unit 13 is chosen such that one of the two drinker valves 12 of the respective drinker location 11 is opened to the maximum in a maximum deflection of the rod 33 of the activation means 29 to one side, on account of the valve pin 16 being lifted vertically or at least in a substantially vertical manner. The delimitation of the pivoting path of the rod 33 simultaneously serves herein for preventing the valve pin 16 being pushed impermissibly far into the housing 15 of the respective drinker valve 12.

Figure 5:
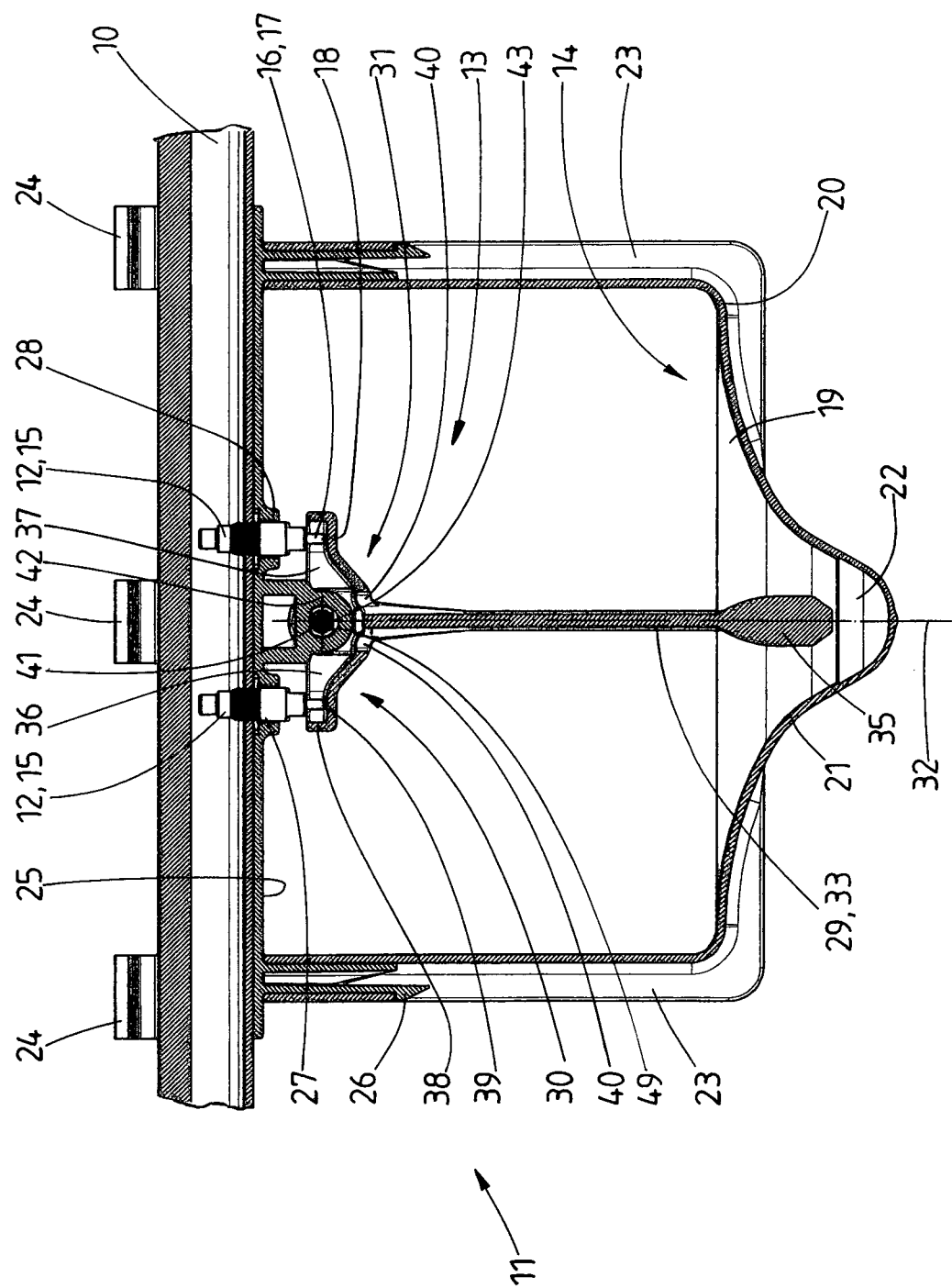
FIG. 5 shows a vertical longitudinal section through the water dispensing location of FIG. 2 with closed drinker valves.
Figure 6:
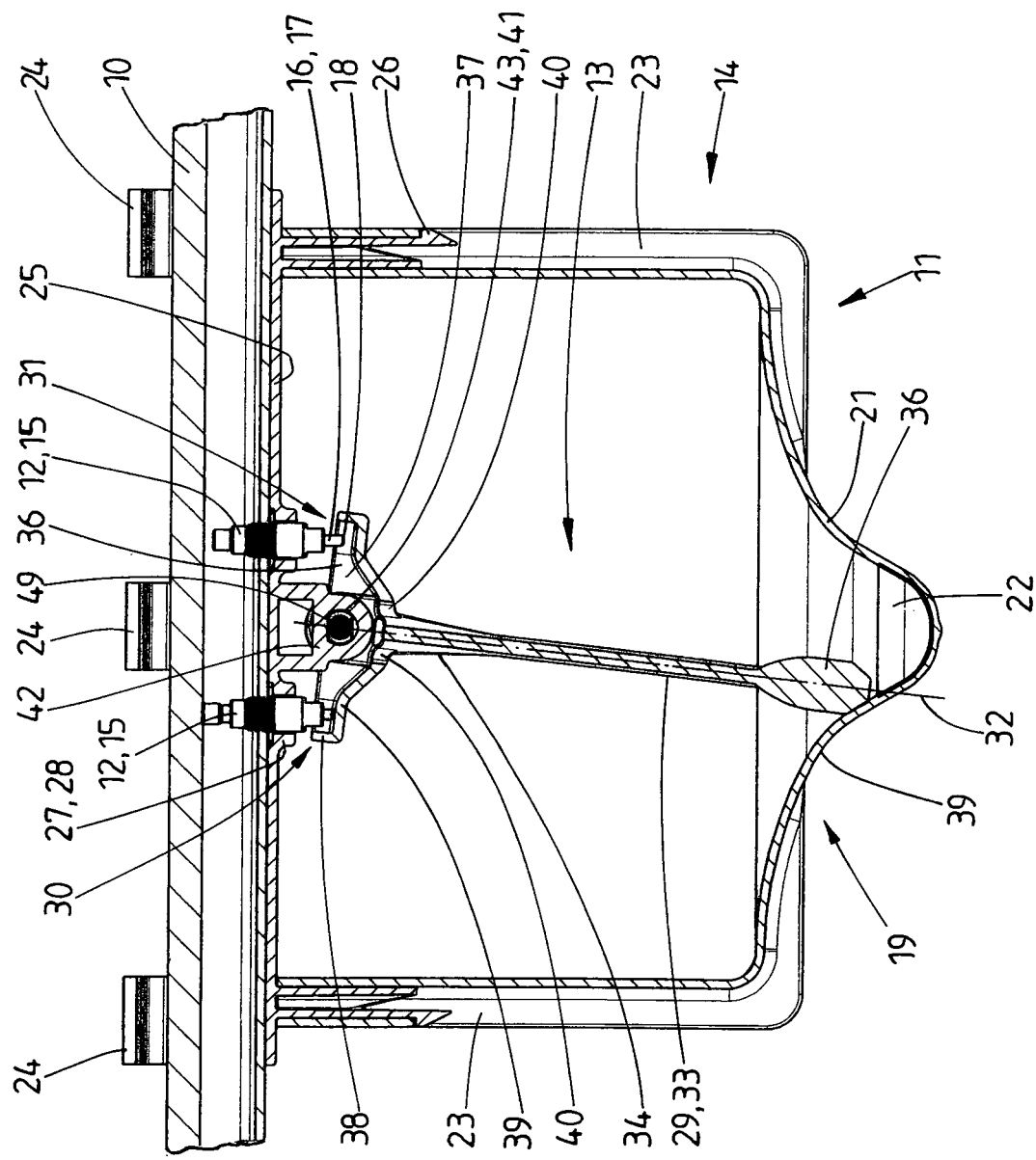
FIG. 6 shows an illustration according to FIG. 5 with an opened drinker valve.

In order for the valve pin 16 not to be tilted but to only or substantially only to be lifted when opening the respective drinker valve 12, each arm 30, 31 is configured such that said arm by way of a substantially only perpendicular force component acts on the lower end of the valve pin 16 and pushes the latter upward in an only perpendicular or substantially perpendicular manner. For this purpose, the portion of the base wall 39 that communicates with the lower end of the valve pin 16 of the respective drinker valve 12 in the exemplary embodiment shown is provided with such a profile that the valve pin 16 for opening the respective drinker valve 12 by said portion of the base wall 21 of the respective arm 30, 31 is lifted substantially only by way of a force component that is on the longitudinal central axis of said valve pin 16. For this purpose, the portion of the base wall 39 of each arm 30, 31 that communicates with the lower end of the valve pin 16 of the respective drinker valve 12, in the case of a non-deflected activation means 29 situated in the resting position, runs approximately horizontally. Accordingly, the longitudinal central axis 32 of the rod 33 in the case of a non-activated activation means 29 runs in the perpendicular direction (FIG. 5).

The drinker valves 12 of the drinker location 11 can be opened in an alternating manner by pivoting the activation means 29 of the activation unit 13 in opposite directions about the rotation axis 41. With reference to the illustration in FIG. 6, the activation unit 13 is pivoted in the clockwise direction about the rotation axis 41, on account of which the left drinker valve 12 is opened. The drinker valve 12 situated on the other side of the drinker valve 12 remains closed herein. The activation unit 13 can be deflected in the manner of a pendulum so far until the lower end of the rod 33 by way of a wing 35 bears on the base wall 21 in the region of the bowl 22 of the tray part 19. The opening of the drinker valve 12 is performed by the activation unit 13 by moving the valve pin 16 upward along the longitudinal axis of the latter, this being performed by the arm 30. Tilting of the valve pin 16 herein does not take place, or if at all takes place only to a very minor and negligible extent.

The activation unit 13 on the activation means 29 is pivotable by the respective beaked animal in that the latter, using its peak, pushes against the rod 33 of the activation means 29, specifically preferably somewhere in the region of the lower half of said activation means 29. The beaked animal can tilt the rod 33 of the activation means 29 only so far until said rod 33 by way of the lower end thereof impacts the base wall 21 in the region of the bowl 22 of the tray part 19.

When a drinker valve 12 is opened by the activation unit 13, the exiting water runs through the groove 36 of the respective arm 30, which has currently opened a drinker valve 12, in the direction toward the rod 33. On account of the respective through bore 43 at the end of the groove 36 of the respective arm 30, the water exits the groove 36. The water then runs along the rod 33 of the activation means 29 from the top to the bottom so as to make its way into the tray part 19 of the water collection tray 14 at the end of said rod 33. The beaked animal can there receive the water.

When the beaked animal releases the activation unit 13, in particular the rod 33 of the latter, the entire activation unit 13 on account of the dead weight thereof and of the valve pin 16 makes its way in a self-acting manner back to the initial position of said activation unit 13 (FIG. 5) in which the longitudinal central axis 32 of the rod 33 of the activation means 29 runs perpendicularly and the arms 30, 31 are again oriented horizontally, wherein the part of the base wall 39 of each arm 30, 31 that bears on the lower end 18 of the respective valve pin 16 runs horizontally.

The opposite (right) drinker valve 12 is opened by pivoting the activation unit 13 in the counter-clockwise direction. This is performed in the same manner as has been described above in the context of the left drinker valve 12 of the drinker location 11. The right drinker valve 12 is likewise closed again.

Figure 7:
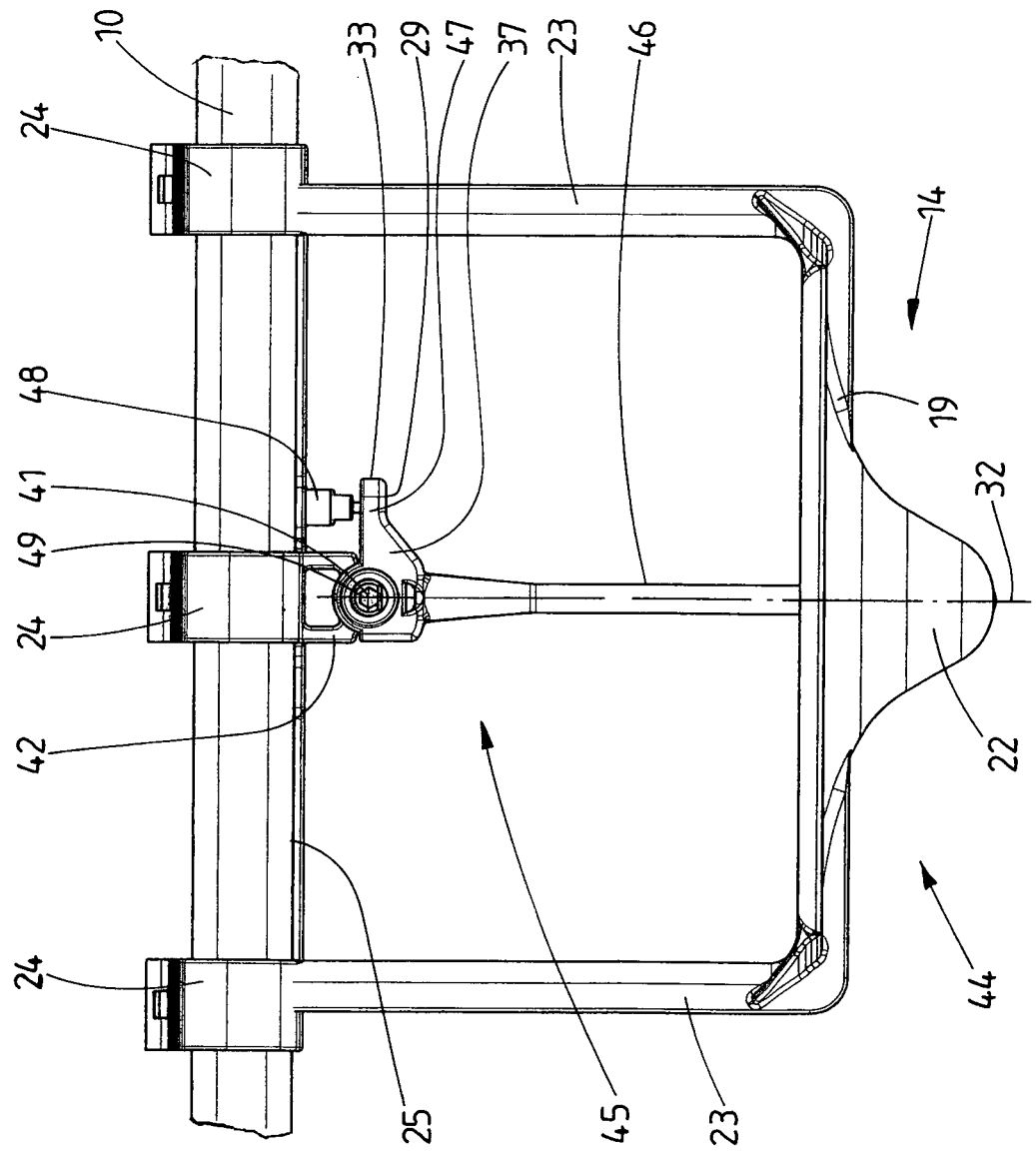
FIG. 7 shows a lateral view of a drinker location having only one drinker valve.

FIG. 7 shows an alternative exemplary embodiment of the animal drinker which differs from the exemplary embodiment described above only in that the drinker location 44 has an activation unit 45 which possesses only one activation means 46 having a single arm 47. In this activation unit 45, the drinker location 44 is provided with only a single drinker valve 48. The activation means 46 and the arm 47 of the activation unit 45 are configured exactly as in the exemplary embodiment described above, such that reference is made to the preceding description of said exemplary embodiment.

Reference signs of FIGS. 2 to 6 are used for the same parts in FIG. 7. The same applies to the drinker valve 48 of the drinker location 44.

Because the activation unit 45 in the exemplary embodiment of FIG. 7 possesses only a single arm 47, the single drinker valve 48 of the drinker location 44 can be opened only by pivoting the elongate activation means 46 in one direction, specifically in a counter-clockwise direction in the exemplary embodiment of FIG. 7. The opening and closing procedure corresponds to that of the exemplary embodiment described above. Here too, the valve pin 16 of the drinker valve 48 for opening the latter is moved upward substantially only along the longitudinal central axis of said valve pin 16.

An alternative exemplary embodiment in which the activation means are not configured as solid rods but as straight elongate pipes under the arm, or the arms, respectively, is conceivable. Water exiting the drinker valve is in this instance guided from the groove of the respective arm directly into the interior of the pipe. The water subsequently flows through the pipe where said water at the lower end of the pipe makes its way into the tray part of the water collection tray.

In all exemplary embodiments of the animal drinker described above, the activation unit on the one hand and the water collection tray on the other hand are in each case integrally formed from plastics material, in particular thermoplastic plastics material. The rotary bearing herein is preferably integrally molded on the respective water collection tray, in particular on the web of said water collection tray below the water supply line. The same applies to the holding clips and the latching means.

LIST OF REFERENCE SIGNS

| | |
|---|---|
| 10 | Water supply line |
| 11 | Drinker location |
| 12 | Drinker valve |
| 13 | Activation unit |
| 14 | Water collection tray |
| 15 | Housing |
| 16 | Valve pin |
| 17 | Lower end region |
| 18 | Lower end |
| 19 | Tray part |
| 20 | Rim |
| 21 | Base wall |
| 22 | Bowl |
| 23 | Holding arm |
| 24 | Holding clip |
| 25 | Web |
| 26 | Latching means |
| 27 | Passage |
| 28 | Collar |
| 29 | Activation means |
| 30 | Arm |
| 31 | Arm |
| 32 | Longitudinal central axis |
| 33 | Rod |
| 34 | Groove |
| 35 | Wing |
| 36 | Channel |
| 37 | Lateral wall |
| 38 | End wall |
| 39 | Base wall |
| 40 | Cutout |
| 41 | Rotation axis |
| 42 | Rotary bearing |
| 43 | Through bore |
| 44 | Drinker location |
| 45 | Activation unit |
| 46 | Activation means |
| 47 | Arm |
| 48 | Drinker valve |
| 49 | Axle stump |

The invention claimed is:

1. An animal drinker comprising:
   drinker valves connected to a water supply line, each of the drinker valves includes:
      a valve pin which is movable for dispensing water, and an end region that protrudes downward from a housing,
      an activation unit with a pivotable elongate activation means for the valve pin operable to open the drinker valves,
      an end of the activation means that points toward the drinker valves and that includes two arms which points sideways and which communicates with the drinker valves such that one of the two arms opens one drinker valve and an other arm of the two arms opens an other drinker valve in an alternating manner,
      a water collection tray,
   wherein two drinker valves are operable by to the activation unit, and
   wherein the two arms are at an upper end of the activation means and project on two opposite sides of the activation means, and
   wherein the two arms communicate with a lower free end of the valve pin of the two drinker valves.

2. The animal drinker as claimed in claim 1, characterized in that the the two arms extend at least up to the lower free end of the valve pin of the two drinker valves.

3. The animal drinker as claimed in claim 1, characterized in that the two arms project laterally from the activation means so as to be oriented substantially transversely to the longitudinal central axis of the activation means.

4. The animal drinker as claimed in claim 1, characterized in that the activation unit is pivotable about a rotation axis which runs transversely to the longitudinal central axis of said activation unit that in the non-activated state is approximately vertical.

5. The animal drinker as claimed in claim 4, characterized in that the rotation axis runs transversely to the substantially horizontal longitudinal axis of the water supply line.

6. The animal drinker as claimed in claim 4, characterized in that the rotation axis is assigned to a rotary bearing which is disposed so as to be locationally fixed below the water supply line.

7. The animal drinker as claimed in claim 6, characterized in that the rotary bearing is fastened to the water supply line.

8. The animal drinker as claimed in claim 6, characterized in that the rotary bearing is disposed on a suspension of the water collection tray on the water supply line.

9. The animal drinker as claimed in claim 4, characterized in that the rotation axis is at an end region of the activation means that points toward the water supply line.

10. The animal drinker as claimed in claim 1, characterized in that the respective arm at the upper end of the activation means is configured as a channel which is open at the top, or has a channel which is open at the top.

11. The animal drinker as claimed in claim 10, characterized in that part of a base wall of the channel of the two arms communicate with the free lower end of the valve pin of the two drinker valves.

12. The animal drinker as claimed in claim 10, characterized in that part of a base wall of the channel of the two arms communicate with the free lower end of the valve pin of the two drinker valves in such a manner that a respective valve pin is able to be lifted when pivoting the activation means.

13. The animal drinker as claimed in claim 10, characterized in that the channel of the two arms at the upper end region of the activation means extends up to the upper end region of the activation means.

14. The animal drinker as claimed in claim 1, characterized in that the activation means is at least largely configured in the manner of a rod.

15. The animal drinker as claimed in claim 1, characterized in that the activation means is configured as a pipe and has at least one upper opening for infeeding water.

* * * * *